United States Patent
Erickson et al.

(10) Patent No.: US 12,321,502 B2
(45) Date of Patent: Jun. 3, 2025

(54) INTEGRITY AND DATA ENCRYPTION (IDE) BUFFER DEVICE WITH LOW-LATENCY CONTAINMENT MODE

(71) Applicant: Rambus Inc., San Jose, CA (US)

(72) Inventors: Evan Lawrence Erickson, Chapel Hill, NC (US); John Eric Linstadt, Palo Alto, CA (US)

(73) Assignee: Rambus Inc., San Jose, CA (US)

( * ) Notice: Subject to any disclaimer, the term of this patent is extended or adjusted under 35 U.S.C. 154(b) by 261 days.

(21) Appl. No.: 18/130,362

(22) Filed: Apr. 3, 2023

(65) Prior Publication Data

US 2023/0325540 A1 Oct. 12, 2023

Related U.S. Application Data

(60) Provisional application No. 63/328,399, filed on Apr. 7, 2022.

(51) Int. Cl.
   *G06F 21/79* (2013.01)
   *G06F 21/60* (2013.01)
   *G06F 21/85* (2013.01)
(52) U.S. Cl.
   CPC ............ *G06F 21/79* (2013.01); *G06F 21/602* (2013.01); *G06F 21/85* (2013.01)

(58) Field of Classification Search
   CPC ......... G06F 21/79; G06F 21/602; G06F 21/85
   See application file for complete search history.

(56) References Cited

U.S. PATENT DOCUMENTS

| | | | |
|---|---|---|---|
| 6,973,570 | B1 | 12/2005 | Hamlin |
| 8,578,477 | B1 | 11/2013 | Lin et al. |
| 10,073,977 | B2 | 9/2018 | Pappachan et al. |
| 10,936,213 | B2 | 3/2021 | Duval et al. |
| 10,984,136 | B2 | 4/2021 | Dover |
| 11,050,569 | B2 | 6/2021 | Chen et al. |
| 11,074,199 | B2 | 7/2021 | Heinrich et al. |
| 2023/0351058 | A1* | 11/2023 | Rajaie ................. G06F 21/78 |
| 2024/0194231 | A1* | 6/2024 | Song ................. G11C 7/1039 |

* cited by examiner

*Primary Examiner* — Benjamin A Kaplan
(74) *Attorney, Agent, or Firm* — Lance Kreisman; Peninsula Patent Group

(57) ABSTRACT

A buffer integrated circuit (IC) chip is disclosed. The buffer IC chip includes host interface circuitry to receive a request from at least one host. The request includes at least one command to access a memory. Memory interface circuitry couples to the memory. Message authentication circuitry performs a verification operation on the received request. Selective containment circuitry, during a containment mode of operation, (1) inhibits changes to the memory in response to the at least one command until completion of the verification operation, and (2) during performance of the verification operation, carries out at least one non-memory modifying sub-operation associated with the at least one command.

20 Claims, 5 Drawing Sheets

| FLIT 1 | FLIT 2 | FLIT 3 | FLIT 4 | FLIT 5 |
| --- | --- | --- | --- | --- |
| R1 R2 W1 | W1 W2 | W2 | R3 R4 W3 | W3 |

# INTEGRITY AND DATA ENCRYPTION (IDE) BUFFER DEVICE WITH LOW-LATENCY CONTAINMENT MODE

CROSS-REFERENCE TO RELATED APPLICATIONS

This application is a Non-Provisional that claims priority to U.S. Provisional Application No. 63/328,399 filed Apr. 7, 2022, entitled INTEGRITY AND DATA ENCRYPTION (IDE) BUFFER DEVICE WITH LOW-LATENCY CONTAINMENT MODE, which is incorporated herein by reference in its entirety.

TECHNICAL FIELD

The disclosure herein relates to Integrity and Data Encryption (IDE) buffer devices, related methods, systems and modules that employ such devices.

BRIEF DESCRIPTION OF THE DRAWINGS

Embodiments of the disclosure are illustrated by way of example, and not by way of limitation, in the figures of the accompanying drawings and in which like reference numerals refer to similar elements and in which.

DETAILED DESCRIPTION

Embodiments of buffer devices, methods, systems and associated integrated circuit devices are disclosed herein. One embodiment of a buffer integrated circuit (IC) chip described herein includes host interface circuitry to receive a request from at least one host. The request includes at least one command to access a memory. Memory interface circuitry couples to the memory. Message authentication circuitry performs a verification operation on the received request. Selective containment circuitry, during a containment mode of operation, (1) inhibits changes to the memory in response to the at least one command until completion of the verification operation, and (2) during performance of the verification operation, carries out at least one non-memory modifying sub-operation associated with the at least one command. By carrying out the at least one non-memory modifying sub-operation during the containment mode of operation, certain tasks associated with memory access operations may be performed during the pendency of the verification operation, rather than after the verification operation, thus reducing overall latency and improving performance.

Figure 1:
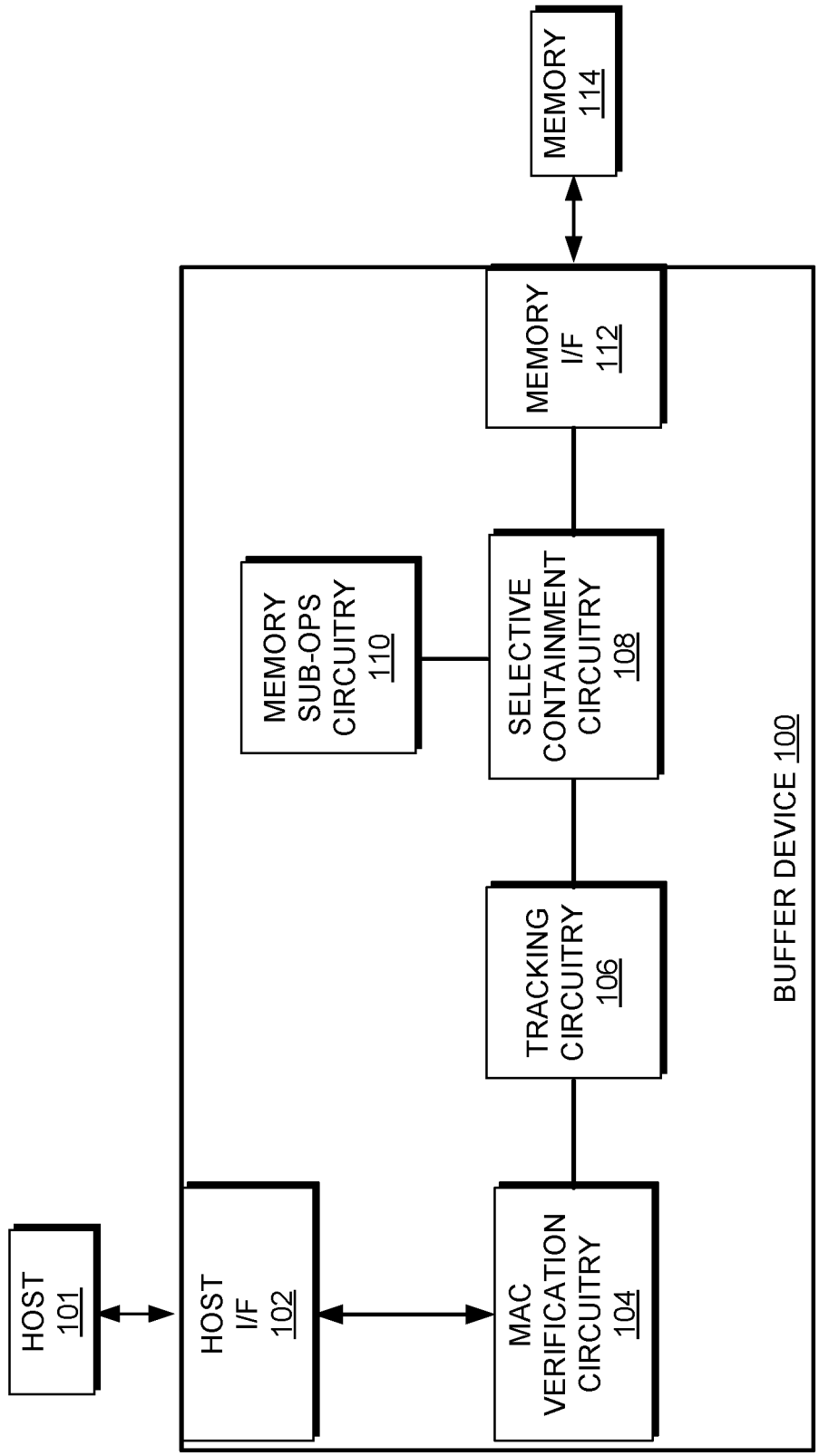
FIG. 1 illustrates one embodiment of an Integrity and Data Encryption (IDE) buffer device.

Referring now to FIG. 1, one embodiment of a buffer device, generally designated 100, includes a host interface 102 for coupling to an external host 101. A memory interface 112 couples the buffer device 100 to a memory 114. For one specific embodiment, the host interface 102 is configured to receive requests from the host 101 that are integrity protected with a link encryption code, such as a message authentication code (MAC). The requests may take the form of commands, data and/or interrupts. In certain embodiments, as explained more fully below with respect to FIG. 3, the host interface 102 may include a high-bandwidth Compute Express Link (CXL) interface.

Further referring to FIG. 1, for specific embodiments, groups of requests may undergo a form of decryption, or verification during a containment mode of operation. The containment mode of operation generally inhibits changes to the memory 114 in response to a memory access command, specified in one of the group of requests, until the verification is complete. The MAC, as a form of tag, is employed for authenticating the requests, thus confirming that the requests came from the host 101 and were not changed following transmission from the host 101. The MAC may be associated with a private key along with a public key that is pre-provisioned to the buffer device 100. In some instances, the MAC may also be associated with a symmetric key that is provided to both the host 101 and the buffer device 100. Moreover, depending on the application, the keys may be different in each direction of the link. For one embodiment, as requests are received by the host interface 102, they are passed to MAC verification circuitry 104 to perform the verification process.

With continued reference to FIG. 1, for one embodiment, the MAC verification circuitry 104 performs operations to verify that the received requests originated from the host 101 and were not changed following transfer from the host 101. This generally involves receiving a remote MAC from within a follow-on group of received requests, generating a local MAC using the received requests that are being verified, and comparing the remote MAC to the locally-generated MAC. If the two MACs match, then the verification is successful. If the two MACS fail to match, then a breach or fault condition is triggered.

In an effort to reduce any delay, or latency, involved in the verification process, and further referring to FIG. 1, one embodiment of the buffer device 100 employs tracking circuitry 106 that cooperates with selective containment circuitry 108 and memory sub-operations circuitry 110 to allow for various sub-processing to take place associated with a given memory access command in parallel with, or substantially concurrent with, the verification process associated with the memory access command. For one embodiment, once the MAC verification circuitry 104 begins the verification process, the tracking circuitry 106 tags each command with a MAC identification (ID), such that the tagging is achieved at a command level of granularity. The selective containment circuitry 108 then parses and buffers the commands and/or data based on the associated command type. For specific embodiments, examples of commands include read, write, partial write, and read-modify-write. Each parsed command, with its tag or MAC ID, is then evaluated and processed to the extent allowable during the verification process, without modifying the memory.

Figure 2:
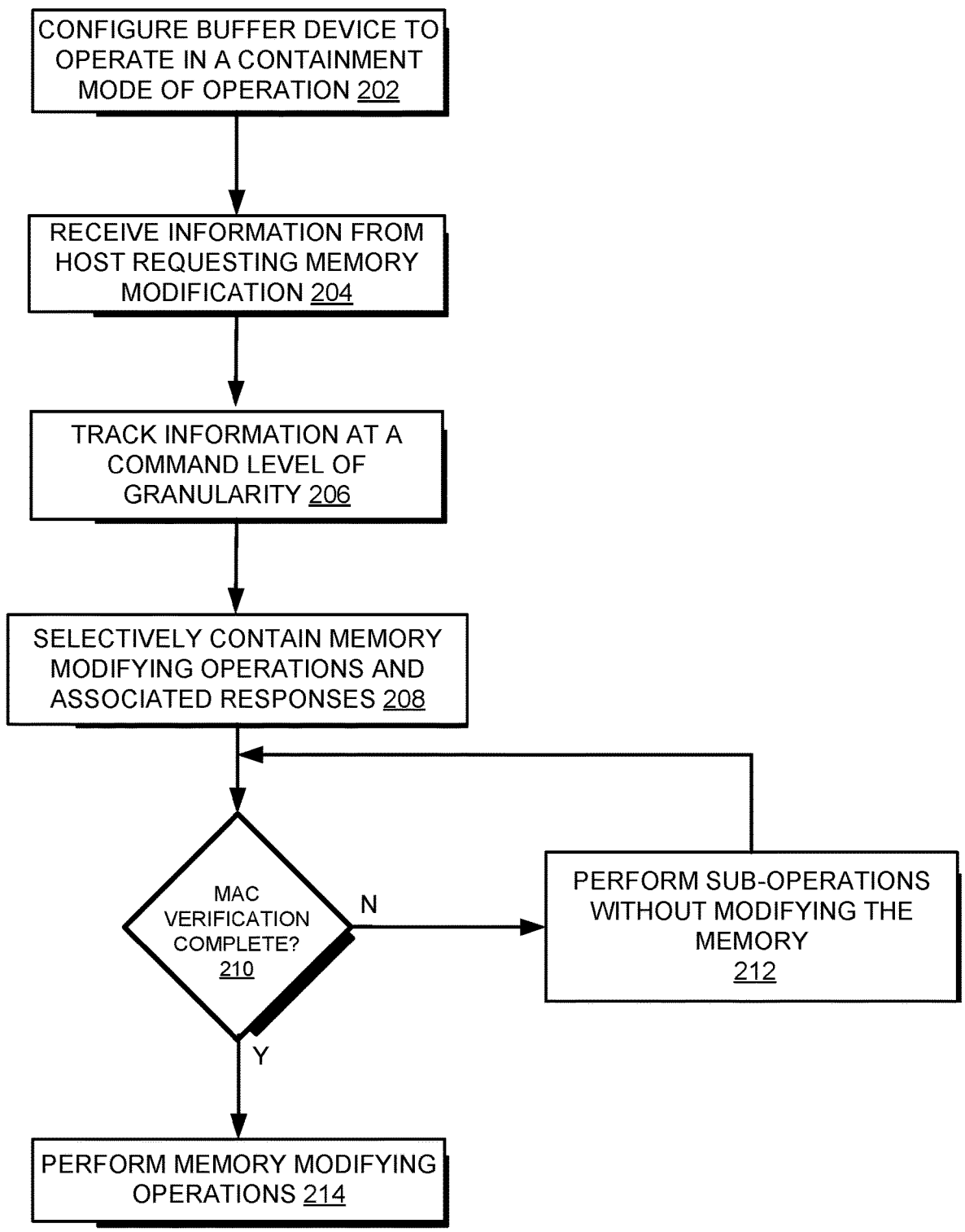
FIG. 2 illustrates a flowchart of steps for one embodiment of operating the IDE buffer device of FIG. 1.

FIG. 2 illustrates a flowchart of steps for one specific embodiment of a method that may be performed to operate the buffer device 100 in a manner that selectively inhibits commands to modify the memory until a MAC verification of the memory-modifying command is complete. During an initialization or configuration mode, the buffer device 100 may be configured to operate in a containment mode of operation, at 202. As explained above, the containment mode of operation inhibits the memory 114 from being modified in response to a write-related command until the command is verified via a MAC verification process. At 204, the buffer device 100 receives information or commands from the host requesting a modification to the memory, such as a request to perform a write operation. The MAC verification of the received commands by the MAC verification circuitry 104 automatically begins once received. While the MAC verification is in progress, the received information and/or commands are tagged with MAC IDs, and tracked at a command level of granularity, at 206.

Further referring to FIG. 2, at 208, while operating in the containment mode of operation, memory modifying operations and associated responses received at 204 are selectively contained. For read commands, the selective containment circuitry 108 allows for release directly to a memory interface 112 for dispatch to the memory 114, since read operations do not modify the memory. For write-related commands, however, the selective containment circuitry 108 queues the memory access command portion of the write operation and its write data proximate the memory interface 112. The queuing temporarily inhibits transmission of the write command to the memory interface 112, but allows a corresponding write response, or acknowledgement, to be distributed to the memory sub-operations circuitry 110 for sub-operations processing near the host interface 102. Examples of sub-operations that may be performed while associated commands and responses are being contained include error coding, read-modify-write processing, and any other routing or configuring of commands, responses and/or data that may be performed in parallel or substantially concurrent with the MAC verification. While the selective containment circuitry 108 interacts with the memory sub-operations circuitry 110, determinations are made, at 210, as to whether the MAC verification for the queued information is complete. If not, then further sub-operations may be performed without modifying the memory, at 212. For some embodiments, the determining and performing steps 210 and 212 may repeat until the verification completes.

With continued reference to FIG. 2, once the MAC verification circuitry 104 finishes the verification process for the given request, the tracking circuitry 106 updates its tracked IDs for dispatch to the selective containment circuitry 108 and the memory sub-operations circuitry 110. For some embodiments, the tracked MAC IDs may be managed in verification tables and compared to the MAC IDs that are tagged to associated requests in containment. Following comparison to a verified MAC ID, the verified commands may then be released from containment and passed to both the memory interface 112 (for writes) to allow performance of memory modifying operations, at 214, and dispatches to the host interface 102 (for responses). For situations where the verification fails, the queued responses and commands associated with the failed verification may be flushed from the selective containment circuitry 108, and an appropriate response indicating the failure dispatched by the buffer device 100 to the host 101.

The buffer device 100 and the associated selective containment method described above lend themselves well to applications involving distributed processing with hardware-based security schemes. In the field of distributed memory processing and memory pooling, CXL Type 3 devices, such as CXL buffers, may exhibit significantly improved performance through adoption of the buffer device structures and associated selective containment methods disclosed herein.

Figure 3:
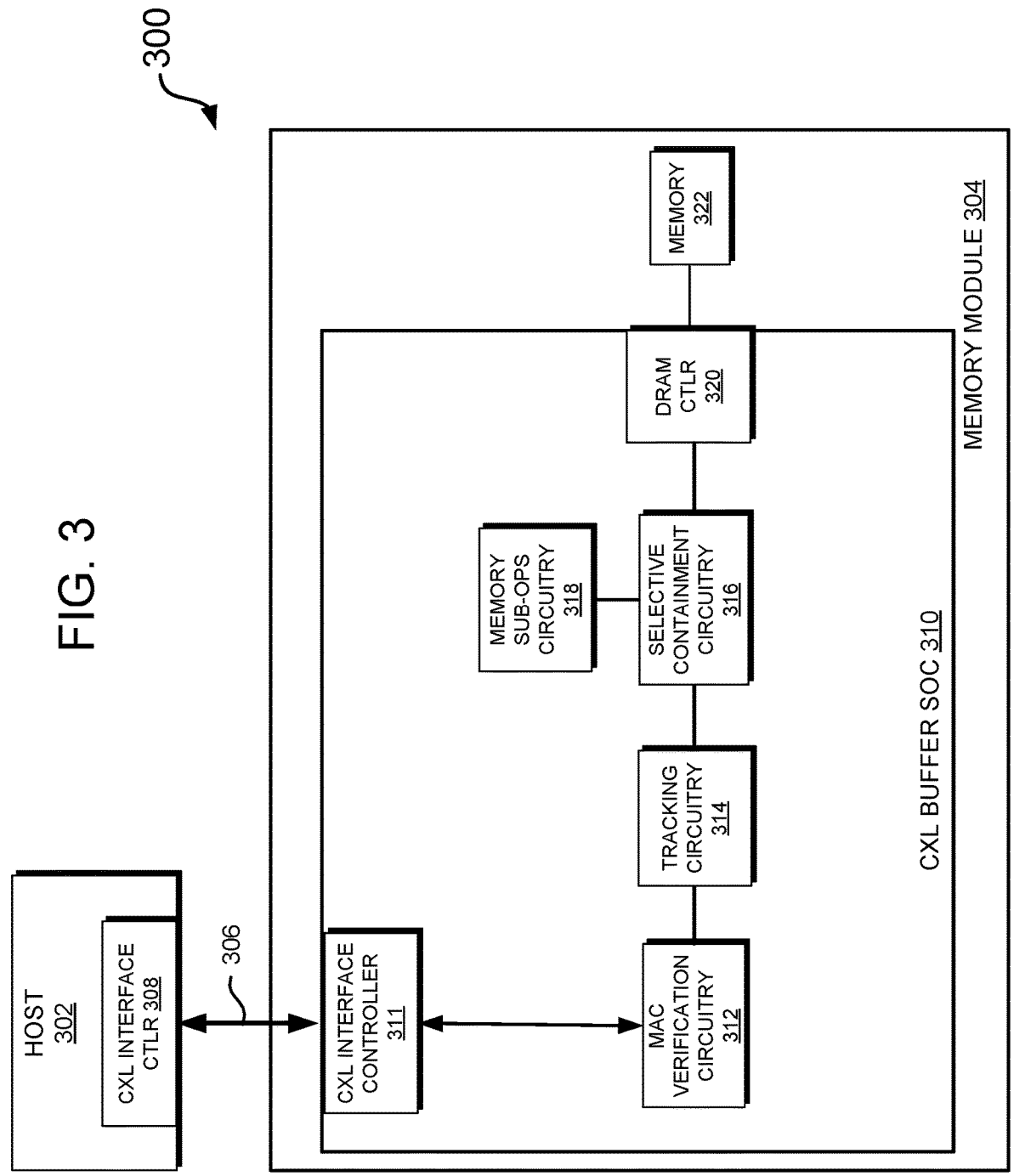
FIG. 3 illustrates one embodiment of a memory system employing a compute express link (CXL) buffer integrated circuit (IC) chip that is similar to the IDE buffer device of FIG. 1.

FIG. 3 illustrates one specific embodiment of a memory system, generally designated 300, that employs a CXL Type 3 memory device in the form of a CXL buffer system-on-chip (SOC) 310. The memory system 300 includes a host 302 that interfaces with a memory module 304 primarily through a CXL link 306. For one embodiment, the host 302 includes a host CXL interface controller 308 for communicating over the CXL link 306 utilizing protocols consistent with the CXL standards, such as CXL.io and CXL.mem. For some embodiments that involve CXL Type 2 devices, an additional CXL.cache protocol may also be utilized.

Further referring to FIG. 3, the memory module 304 is configured to generally support the distributed CXL memory architecture, thus allowing one or more hosts such as host 302 to access module memory 322. The module memory 322 may take the form of volatile memory, such as dynamic random access memory (DRAM) and/or non-volatile memory, such as Flash memory, via the CXL buffer 310. For one embodiment, the CXL buffer 310 takes the form of a system-on-chip (SOC) and includes many of the features described above with respect to the buffer device 100 (FIG. 1).

With continued reference to FIG. 3, one embodiment of the CXL buffer 310 employs an overall architecture similar to that of FIG. 1, with a host interface that includes an in-band CXL external interface controller 311 and module memory control circuitry in the form of a dynamic random access memory (DRAM) controller 320. Requests received by the CXL interface controller 311 are fed to MAC verification circuitry 312, which, in a containment mode of operation, performs MAC verifications on groups of requests. Tracking circuitry 314 cooperates with selective containment circuitry 316 and memory sub-ops circuitry 318 in a manner similar to that described above for the buffer device 100.

For one embodiment, transfers of requests involving the CXL buffer 310 are carried out using 528-bit packets, referred to as "flits." Each flit may include one or more commands and/or other information (such as data and/or responses). For one specific protocol, while operating in the containment mode of operation, a given MAC is sent every five flits, with the five flits defining a MAC epoch. Thus, for every group of five flits, CXL.mem protocol responses must not be sent back to the host until the MAC epoch is verified.

Figure 4:
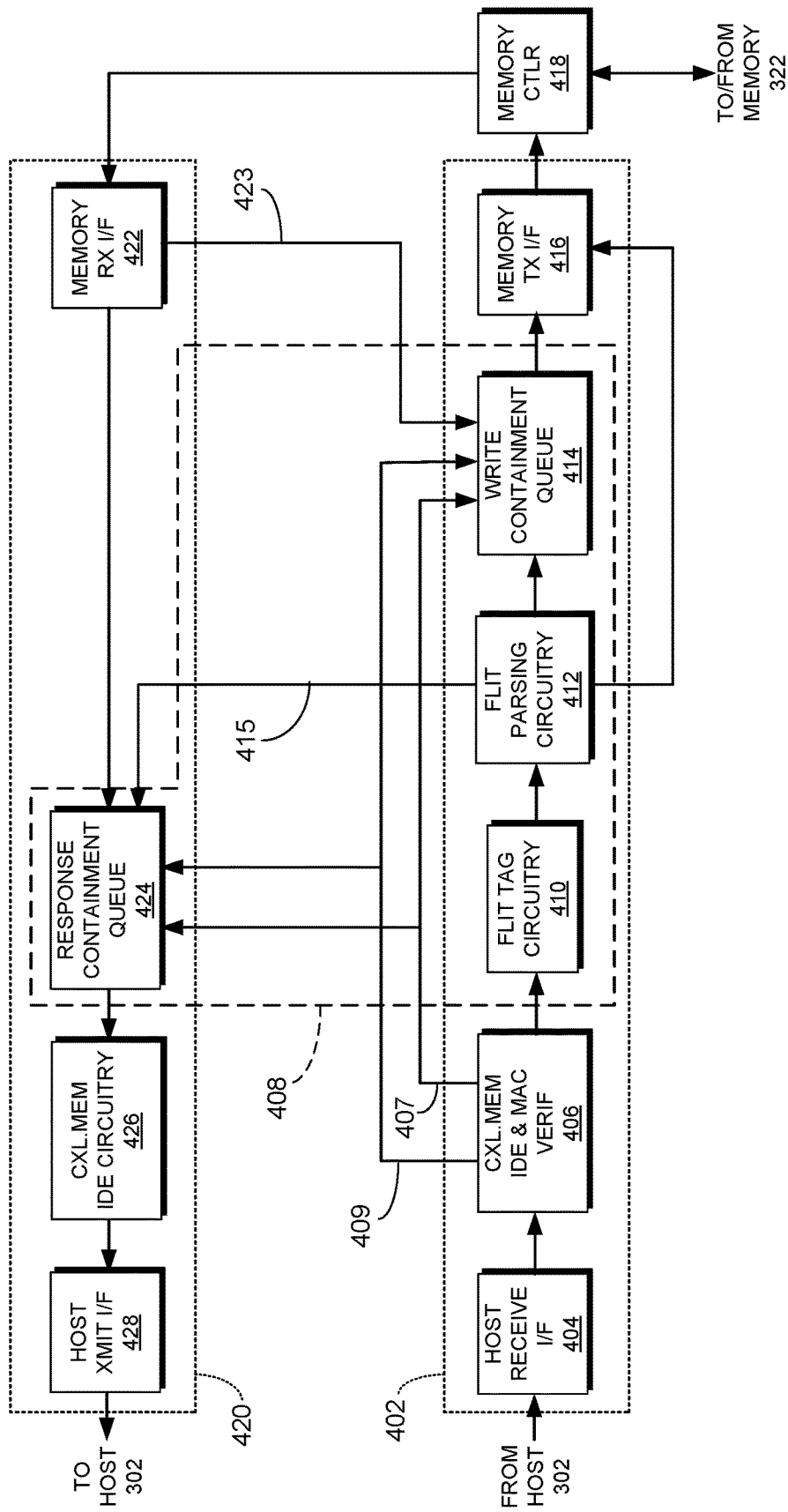
FIG. 4 illustrates further detail for one embodiment of the CXL buffer IC chip of FIG. 3.

To minimize latency that may arise due to verifying each MAC epoch, one specific embodiment of the CXL buffer 310 employs selective containment circuitry in the form of a multi-queue architecture for temporarily storing write information and responses during MAC epoch verification. FIG. 4 illustrates further details for one embodiment of the architecture, which generally includes a command path 402 and a response path 420. The command path 402 includes a host receive interface 404 that receives flits from the host 302. The host receive interface 404 feeds the received flits to a CXL.mem IDE and MAC verification circuit 406.

With continued reference to FIG. 4, the CXL.mem IDE and MAC verification circuit 406 manages the MAC verification process for each MAC epoch, and provides both a single-bit verification status (success or failure), on path 407, and a multi-bit indicator (MAC ID) of the last MAC ID verified, on path 409. The verification status and last verified MAC ID are fed to selective containment circuitry 408 (in phantom) to provide status and identification information for tracking parsed write-related commands, associated data and responses during the MAC epoch verification, explained below.

Further referring to FIG. 4, one embodiment of the selective containment circuitry 408 includes tracking circuitry in the form of flit tag circuitry 410 and flit parsing circuitry 412. Multiple distributed buffers in the form of a write containment queue 414 and a response containment queue 424 are also provided by the selective containment circuitry 408. Following initiation of the MAC epoch verification, the flits are passed to the flit tag circuitry 410, where each flit is tagged with a MAC ID. Once the MAC ID is tagged to each flit included in the MAC epoch, flit parsing circuitry 412 sorts the commands by command type and extends the MAC ID to each command. This conveniently provides a command level of granularity for tracking purposes. For some embodiments, the flit parsing circuitry 412 also manages a write response flow along path 415, with responses then queued in the response containment queue 424 until the MAC epoch is verified.

Figure 5:
FIG. 5 illustrates one embodiment of a sequence of flits received by the CXL buffer IC chip of FIG. 4.

FIG. 5 illustrates a MAC epoch of five flits with one or more commands included within each flit. Again, while five flits is described herein as one specific embodiment of a MAC epoch, depending on the application, a MAC epoch may be configured to include any number of flits. For one embodiment, the different command types that may be included in a given flit include read, write, read with meta data changes, and partial write. Depending on the command type, the flit parsing circuitry 412 distributes each parsed write-related command to the write containment queue 414. In the case of a read command, the command is sent directly to a memory transmit interface 416 for transmission to a memory controller 418. For some embodiments, a partial write command may be converted to a read-modify-write command, with the write component being contained by the write containment queue 414, while the read component of the command is sent to the memory interface 416 for transmission to the memory 322. Read commands with meta data changes (changes to data that describes and gives information about other data) may be handled similarly.

Further referring to FIG. 4, the write containment queue 414 buffers write commands and associated write data until the MAC epoch verification associated with the commands and data completes. While the capacity of the write containment queue may vary depending on its application, for one specific CXL protocol, a given MAC epoch of five flits undergoing verification must be verified upon receipt of the next group of five flits. Thus, for such an embodiment, a storage capacity sufficient to support at least a rolling window of two MAC epochs (ten flits) may prove beneficial for adequate storage. Further, for some embodiments, the write containment queue 414 may incorporate circuitry to perform error correction encoding on the write commands/data while flits are being contained. Other embodiments may also incorporate read-modify-write logic into the write containment queue 414 so that read components of the read-modify-write operation may be passed to the write containment queue 414 via path 423, while the write component remains in containment. In one embodiment, the write containment queue 414 is positioned proximate the memory transmit interface 416 to minimize the transmission path and associated transmit time for the write commands and write data to propagate from the write containment queue 414 to the memory controller 418 when released from containment.

With continued reference to FIG. 4, the response path 420 includes a memory receive interface 422 that couples to the memory controller 418. For one embodiment, the memory receive interface 422 may include error decoding circuitry (not shown) to perform error detection and correction EDC operations on read data retrieved from the memory 322. For embodiments that incorporate read-modify-write circuitry in the write containment queue 414, the memory receive interface 422 provides read-modify-write responses to the write containment queue along path 423.

Further referring to FIG. 4, the response containment queue 424 forms a portion of the response path 420 and provides temporary storage for responses associated with the flits undergoing MAC epoch verification. The responses may take the form of alerts, acknowledgements, read data, and the like. A CXL.mem IDE circuit 426 couples to the output of the response containment queue 424 and serves to organize uncontained responses into the proper encrypted IDE protocol for transmission to the host via a host transmit interface 428.

Figure 6:
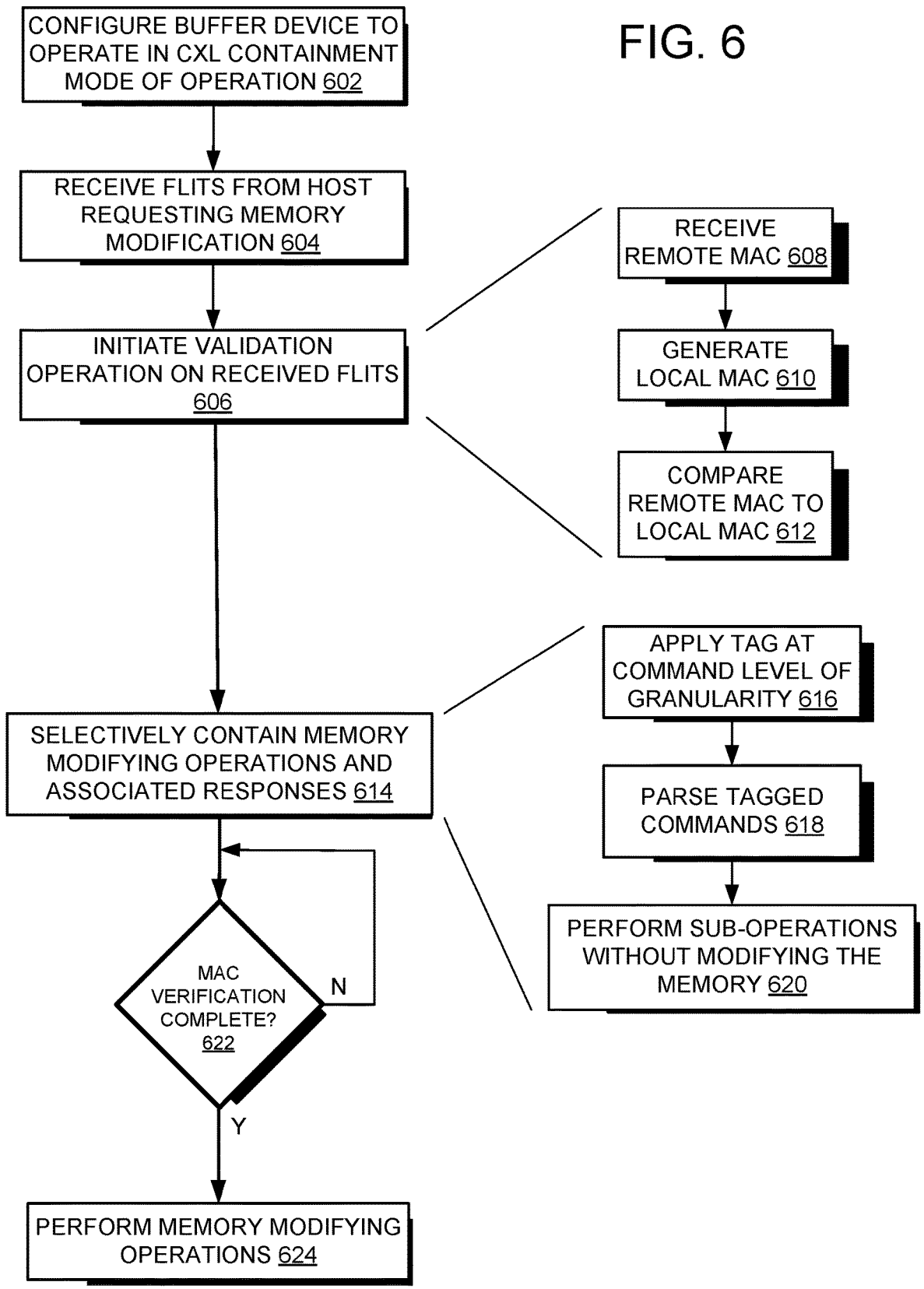
FIG. 6 illustrates a flowchart of steps for one embodiment of operating the CXL buffer IC chip of FIG. 4.

FIG. 6 illustrates a flowchart of steps for one specific embodiment of a method that may be performed to operate the CXL buffer 310 in a manner that selectively contains commands to modify the memory until a MAC verification of the memory-modifying command is complete. During an initialization or configuration mode, the CXL buffer 310 may be configured to operate in a CXL containment mode of operation, at 602. As explained above, the containment mode of operation inhibits the memory from being modified in response to a write-related command until the command is verified via a MAC verification process. For some embodiments, the CXL buffer may be operated in a skid mode of operation rather than the containment mode of operation. In the skid mode of operation, commands and data are not constrained from modifying the memory. Further, MAC verifications are performed far less often (such as once per 128 flits). While this results in less latency, the cost is a significant reduction in security.

Further referring to FIG. 6, at 604, the CXL buffer 310 receives information or commands from the host 302 requesting a modification to the memory 322, such as a request to perform a write operation or a read operation involving a write command component. The CXL.mem IDE and MAC verification circuitry 406 then initiates a MAC verification of the received flits, at 606. This generally involves receiving a remote MAC from within a subsequent MAC epoch of flits, the received requests, at 608, generating a local MAC from the MAC received with the under-verification flits, at 610, and comparing the remote MAC to the locally-generated MAC, at 612. If the two MACs match, then the verification is successful. If the two MACS fail to match, then a breach or fault condition is triggered.

With continued reference to FIG. 6, during the time interval that the MAC verification is in progress, the received flits of the MAC epoch under verification are selectively contained, at 614. For read commands, the selective containment circuitry 408 allows for release directly to the memory transfer interface 416 for dispatch to the memory controller 418 since read operations do not modify the memory. For write-related commands, however, the selective containment circuitry 408 queues the memory access command portion of the write-related operation in the write containment queue 414 proximate the memory transfer interface 416, thereby temporarily inhibiting transmission of the write command to the memory transfer interface 416. While the write command is contained in the write containment queue 414, a corresponding write response, or acknowledgement, is allowed for passage to the response containment queue 424 for temporary storage proximate the host transmit interface 428. This facilitates a shorter response time for the response to travel to the host 302 following release from containment, and correspondingly reducing latency associated with the MAC verification.

Further referring to FIG. 6, while the memory changing commands and information reside in containment, the selective containment circuitry 408 enables as many sub-operations to be accomplished as possible during the MAC verification interval while still inhibiting any changes to the memory. This background processing involves applying a MAC ID tag at a command level of granularity, at 616, and parsing the tagged commands, at 618, so they may be distributed to various locations in the CXL buffer. The sub-operations associated with the memory changing commands may then be performed, at 620. During the selective containment and background processing, the MAC epoch verification is monitored, at 622. When the verification is successfully completed, the CXL.mem IDE and MAC verification circuitry 406 updates and forwards its tracked verification status and verified MAC IDs to verification tables managed by the write containment queues 414 and the response containment queue 424. Associated commands tagged with the verified MAC ID for the successfully-verified flits identified in the MAC verification tables may then be released from containment and passed to both the memory transmit interface 416 (for writes) to allow performance of memory modifying operations, at 624, and dispatches to the host transmit interface 428 (for responses). In this way, once the verification for the given MAC epoch of flits is completed, and the containment halted, then the actual transfer of information may take place more quickly and with less latency than would otherwise have occurred if the sub-operations had not already been performed.

In some situations, the MAC epoch verification process may fail, indicating a security breach, or other error. For one embodiment, a failure in the verification results in flushing of the write and response containment queues, with an appropriate message dispatched to the host.

When received within a computer system via one or more computer-readable media, such data and/or instruction-based expressions of the above described circuits may be processed by a processing entity (e.g., one or more processors) within the computer system in conjunction with execution of one or more other computer programs including, without limitation, net-list generation programs, place and route programs and the like, to generate a representation or image of a physical manifestation of such circuits. Such representation or image may thereafter be used in device fabrication, for example, by enabling generation of one or more masks that are used to form various components of the circuits in a device fabrication process.

In the foregoing description and in the accompanying drawings, specific terminology and drawing symbols have been set forth to provide a thorough understanding of the present invention. In some instances, the terminology and symbols may imply specific details that are not required to practice the invention. For example, any of the specific numbers of bits, signal path widths, signaling or operating frequencies, component circuits or devices and the like may be different from those described above in alternative embodiments. Also, the interconnection between circuit elements or circuit blocks shown or described as multi-conductor signal links may alternatively be single-conductor signal links, and single conductor signal links may alternatively be multi-conductor signal links. Signals and signaling paths shown or described as being single-ended may also be differential, and vice-versa. Similarly, signals described or depicted as having active-high or active-low logic levels may have opposite logic levels in alternative embodiments. Component circuitry within integrated circuit devices may be implemented using metal oxide semiconductor (MOS) technology, bipolar technology or any other technology in which logical and analog circuits may be implemented. With respect to terminology, a signal is said to be "asserted" when the signal is driven to a low or high logic state (or charged to a high logic state or discharged to a low logic state) to indicate a particular condition. Conversely, a signal is said to be "deasserted" to indicate that the signal is driven (or charged or discharged) to a state other than the asserted state (including a high or low logic state, or the floating state that may occur when the signal driving circuit is transitioned to a high impedance condition, such as an open drain or open collector condition). A signal driving circuit is said to "output" a signal to a signal receiving circuit when the signal driving circuit asserts (or deasserts, if explicitly stated or indicated by context) the signal on a signal line coupled between the signal driving and signal receiving circuits. A signal line is said to be "activated" when a signal is asserted on the signal line, and "deactivated" when the signal is deasserted. Additionally, the prefix symbol "/" attached to signal names indicates that the signal is an active low signal (i.e., the asserted state is a logic low state). A line over a signal name (e.g., '<signalname>') is also used to indicate an active low signal. The term "coupled" is used herein to express a direct connection as well as a connection through one or more intervening circuits or structures. Integrated circuit device "programming" may include, for example and without limitation, loading a control value into a register or other storage circuit within the device in response to a host instruction and thus controlling an operational aspect of the device, establishing a device configuration or controlling an operational aspect of the device through a one-time programming operation (e.g., blowing fuses within a configuration circuit during device production), and/or connecting one or more selected pins or other contact structures of the device to reference voltage lines (also referred to as strapping) to establish a particular device configuration or operation aspect of the device. The term "exemplary" is used to express an example, not a preference or requirement.

While the invention has been described with reference to specific embodiments thereof, it will be evident that various modifications and changes may be made thereto without departing from the broader spirit and scope of the invention. For example, features or aspects of any of the embodiments may be applied, at least where practicable, in combination with any other of the embodiments or in place of counterpart features or aspects thereof. Accordingly, the specification and drawings are to be regarded in an illustrative rather than a restrictive sense.

We claim:
1. A buffer integrated circuit (IC) chip, comprising:
   host interface circuitry to receive a request from at least one host, the request including at least one command to access a memory;
   memory interface circuitry for coupling to the memory;
   message authentication circuitry to perform a verification operation on the received request; and
   selective containment circuitry, during a containment mode of operation, to (1) inhibit changes to the memory in response to the at least one command until completion of the verification operation, and (2) during performance of the verification operation, to carry out at least one non-memory modifying sub-operation associated with the at least one command.
2. The buffer IC chip of claim 1, further comprising:
   tracking circuitry to apply a tag to the at least one command at a command level of granularity;

wherein the message authentication circuitry provides a tag verification indicator associated with the tagged command upon completion of the verification operation; and wherein the selective containment circuitry allows changes to the memory associated with the at least one command in response to receiving the tag verification indicator corresponding to the tag.

3. The buffer IC chip of claim 1, wherein the request comprises:

data framed with the at least one command in a flit format and in accordance with a Compute Link Express (CXL) protocol.

4. The buffer IC chip of claim 1, wherein the selective containment circuitry further comprises:

a write containment queue to temporarily store data for writing to the memory; and a response containment queue to temporarily store response information for providing to the at least one host.

5. The buffer IC chip of claim 4, wherein:

the write containment queue is disposed in a write path of the buffer IC chip; and the response containment queue is disposed separate from the write containment queue in a response path of the buffer IC chip.

6. The buffer IC chip of claim 5, wherein:

the write containment queue is disposed proximate the memory interface circuitry; and wherein the response containment queue is disposed proximate the host interface circuitry.

7. The buffer IC chip of claim 1, wherein:

the host interface circuitry comprises a Compute Express Link (CXL) controller; and the memory interface circuitry comprises a Dynamic Random Access Memory (DRAM) memory controller.

8. A buffer device, comprising:

host interface circuitry to receive a request from at least one host, the request including multiple commands to access a memory, the multiple commands including at least one command that involves modifying a memory;

memory interface circuitry for coupling to the memory;

message authentication circuitry to perform a verification operation on the received request; and write containment circuitry, during a containment mode of operation, to (1) inhibit a write operation to the memory in response to the at least one command that involves modifying the memory until completion of the verification operation, and (2) during performance of the verification operation, to carry out at least one non-memory modifying sub-operation associated with the at least one command that involves modifying the memory.

9. The buffer device of claim 8, further comprising:

tracking circuitry to apply a tag to each of the multiple commands;

wherein the message authentication circuitry provides a tag verification indicator associated with each of the tagged commands upon completion of the verification operation; and wherein the selective containment circuitry allows changes to the memory associated with the at least one command that involves modifying the memory in response to receiving the tag verification indicator corresponding to the tag.

10. The buffer device of claim 8, wherein the at least one command that involves modifying a memory comprises one from the group comprised of:

a write command, a read/modify/write command, and a read command associated with a metadata update.

11. The buffer device of claim 8, wherein the request comprises:

write data framed with the multiple commands in a flit format and in accordance with a Compute Link Express (CXL) protocol.

12. The buffer device of claim 8, wherein the write containment circuitry comprises:

a write containment queue to temporarily store data for writing to the memory.

13. The buffer device of claim 8, further comprising:

a response containment queue to temporarily store response information associated with the multiple commands for providing to the at least one host.

14. The buffer device of claim 8, embodied as a single integrated circuit (IC) chip.

15. The buffer device of claim 14, wherein the single IC chip comprises:

a Compute Link Express (CXL) buffer chip.

16. A method of operation in a buffer device, the buffer device including a host interface for receiving a request from a host, the request including at least one command, the buffer device including a memory interface for coupling to a memory, the method comprising:

operating the buffer device in a containment mode of operation;

verifying each received request from the host through an Integrity and Data Encryption (IDE) process;

while verifying a given request, selectively containing the at least one command to (1) inhibit changes to the memory in response to the at least one command until completion of the verifying, and (2) carrying out at least one non-memory modifying sub-operation associated with the at least one command.

17. The method of claim 16, further comprising:

tracking the carrying out of the at least one non-memory modifying sub-operation associated with the at least one command by applying a tag to the at least one command at a command level of granularity;

generating a tag verification indicator associated with the tagged command upon completion of the verifying; and allowing changes to the memory associated with the at least one command in response to receiving the tag verification indicator corresponding to the tag.

18. The method of claim 16, wherein the selectively containing comprises:

distributing containment of data for writing to the memory separate from containment of responses for providing to the host.

19. The method of claim 18, wherein the selectively containing comprises:

temporarily storing data for writing to the memory in a write containment queue; and temporarily storing response information for providing to the at least one host in a response containment queue that is separate from the write containment queue.

20. The method of claim 16, wherein the request comprises:
data framed with the at least one command in a flit format and in accordance with a Compute Link Express (CXL) protocol.

* * * * *